April 14, 1942.   K. SECRETAN ET AL   2,279,695
ELECTRICAL DEVICE FOR INDICATING OR DETERMINING DISTANCES
Filed April 29, 1939
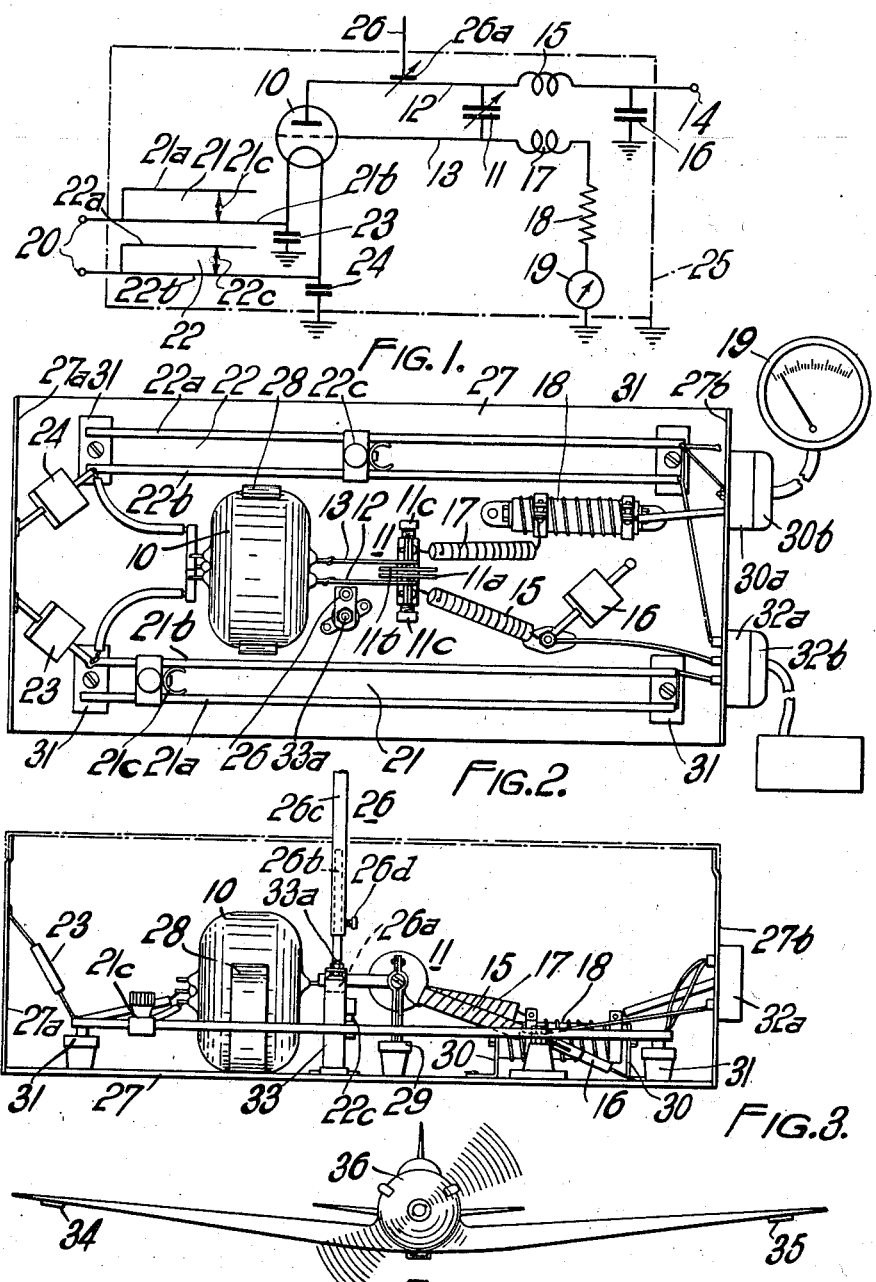

Patented Apr. 14, 1942

2,279,695

UNITED STATES PATENT OFFICE 2,279,695

ELECTRICAL DEVICE FOR INDICATING OR DETERMINING DISTANCES

Kenyon Secretan, Haddenham, and James Horsfall, London, England

Application April 29, 1939, Serial No. 270,736
In Great Britain May 3, 1938

2 Claims. (Cl. 250—1)

This invention relates to devices for indicating or determining distances between two points, of the type operating by virtue of the transmission from one point of a high frequency electromagnetic wave and the reception of said wave after reflection from an object at the distant point.

If an electromagnetic wave is transmitted from a given point and, after reflection from a conductive member, is received at the point, then the transit time of the wave will obviously be related to the distance of the reflector from the point, and many suggestions have been made in the past concerning instruments operating on this principle. For the most part these suggestions have been centred on methods of indicating the distance between the reflector and the transmitter in terms of the wavelength of the transmission employed. Thus it has been suggested that use might be made of a transmission whose wavelength is longer than the distance between the transmitter and reflector and to compare the phase of the transmitted and received waves. Other suggestions have involved the use of shorter wavelengths, but with such wavelengths there arises the difficulty that in comparing the transmitted and received waves a cycle of variation occurs at every wavelength by which the transmitter and reflector are separated.

In a device, for example a terrain clearance indicator, according to the present invention use is made of a very short wave generator in which one resonant circuit subject to variation in frequency with altitude is related to a standard circuit not so subject, and the indication is obtained as a function of the relation of the two said circuits. The generator is shielded and is coupled to an open antenna, and it is found that a meter included in, say, the grid circuit of the valve oscillator employed indicates a current which varies with terrain clearance when the device is suitably carried upon an aircraft.

When the device is used in fixed conditions as on the ground, the indication given varies cyclically with small variations in terrain clearance or with the clearance from an object in the path of the transmitted wave.

According to the present invention use is made of a very short wave, having a frequency of at least 300 megacycles per second and preferably 500, and in such a case it is found that the grid current meter indicates continuously a current which may be calibrated in terms of terrain clearance when used upon an aircraft.

We have come to the conclusion that the device operates to give a continuous indication of terrain or like clearance for the reason that, in addition to the explanation that change of altitude produces a change of constants in the antenna, there occur maxima and minima of variation the separation of which is a function of wavelength, but owing to the extremely short wavelength employed these maxima and minima occur so rapidly that the indicating instrument is unable to follow them and takes up a mean position which in practice gives an indication of clearance.

According to the present invention, therefore, we provide a device for indicating the distance between two relatively moving points by the employment, in a device of the type referred to, of a radiation of such wavelength in relation to the relative speed of the two points that a measuring instrument may be provided so as to be unresponsive to the succession of maxima and minima which occurs.

At the present time we are not positive as to the reason why the device described should indicate on the instrument thereof a reading proportional to the separation of the two points but it is possible that in addition to is function as a generator the valve is serving to rectify the received signal and that the instrument is indicating a current bearing some relation to the amplitude of the received signal, as a result of such rectification.

In the accompanying drawing are shown, by way of example only, certain embodiments of the invention; in the drawing Figure 1 is a circuit diagram of an oscillator suitable for use with the present invention, Figure 2 is a plan view of the oscillator construction, Figure 3 is a side view of the same construction tion shown in Figure 2, and Figure 4 is a diagram of an alternative embodiment.

In the circuit shown in Figure 1, a valve 10 is arranged to operate as an oscillator; between the grid and the anode of the valve is connected a small variable condenser 11 by leads 12, 13 which act as the inductance of the circuit. Anode current from terminal 14 is fed through a radio frequency choke 15 with a decoupling condenser 16 included, and the grid circuit is completed through a further radio frequency choke 17, grid resistance 18, grid current meter 19 (of the damped moving coil type) to earth. Filament supply is fed from terminals 20 to the filament of the valve through high impedance circuits 21, 22 consisting of a pair of conductors 21a, 21b, and 22a, 22b respectively which are adjustably bridged as at 21c, 22c. By-pass condensers 23, 24 are also provided.

The oscillator is adapted to be enclosed with a screened enclosure indicated at 25 out of which casing projects a conductor 26, having at its inner end a small plate 26a which is adjustably mounted with respect to the conductor 12 forming part of the tuned circuit.

Figures 2 and 3 indicate the physical construction of an oscillator such as that shown in Figure 1. The instrument comprises a metal base 27 having upturned ends 27a, 27b. A U-shaped metal clip 28 is provided to receive the valve 10 which is of the type in which the connection to the electrodes is effected by short wire spuds extending from the glass envelope. The conductors 12, 13 are in the form of metal strips fastened at one end to the anode and grid spuds of the valve, whilst at their other ends they are attached to metallic discs 11a, 11b constituting the condenser 11. The discs 11a, 11b are adjustable by screws 11c, 11c, and are carried upon an insulating support 29. The grid resistance 17 is of the wire wound type supported by brackets 30, and the grid current meter 19 is arranged exteriorly of the apparatus and connection is to be made to it by a plug and socket connection 30a, 30b.

The filament supply conductors 21a, 21b and 22a, 22b are arranged as parallel rods or tubes carried upon insulating supports 31, and the bridges 21c, 22c are formed to embrace the surfaces of the rods or tubes. Filament and anode supplies are connected by means of a plug and socket connection 32a, 32b.

The radiating conductor 26 is supported from an insulating pillar 33; the portion 26a is bent at right angles and the horizontal portion is provided with a slot through which a screwed rod 33a projecting from the pillar passes. The conductor may thus be adjusted to and from the conductor 12 adjacent which it is located and further, in order that the rod may be tuned accurately it is made adjustable in length and is made in two parts—a rod 26b and a tube 26c surrounding it so that the total length can be varied. When adjusted to the correct length the two parts may be locked by a screw 26d.

A screening enclosure indicated at 25 is provided for the oscillator, through an aperture in which the conductor 26 projects by an amount such that a quarter wavelength of conductor is within the screen.

In operation the device described is installed in, say, an aircraft with the conductor 26 in a position in which it may radiate to earth. The circuit is adjusted so that at ground level the grid current meter is reading at a minimum figure, preferably at or near zero. When the aircraft leaves the ground the grid current increases with increasing ground clearance and may therefore be calibrated directly in feet. As previously mentioned it is possible that the instrument operates to receive the reflected wave as well as to transmit it, and the current indicated by the meter may be a function of the amplitude of the received signal after it has been rectified by the valve.

In using the device according to the invention it is found that much benefit may be obtained by the use of highly concentrated beams, and by the use of transmission patterns of special form. Planar radiations over 180° or 90° or less, for example, are useful in certain circumstances and use may also be made of conical radiation patterns of various angles, and means may be provided for effecting a desired pattern at will.

For example, in the arrangement shown in Figure 4 of the drawing a separate transmitter 34 and receiver 35 are installed in an aircraft 36. The antenna of the transmitter 34 may be directive so as to give minimum radiation towards the receiver and the receiver may then function primarily to indicate the amplitude of the received signal.

The direction of radiation may however be such that the instrument will indicate reflection only from objects lying on the direction of flight of the aircraft.

It will be understood from the foregoing that the device described will operate not only to indicate the distance separating the transmitter and reflector, but will serve also to indicate the existence of a reflecting body. Thus the invention is applicable not only to the particular devices of which mention has been made but to various others in which use is made of the transmitted and reflected electromagnetic wave.

What we claim and desire to secure by Letters Patent is:

1. A device of the character described for indicating the distance between one point at which said device is located and a remote point, comprising a space discharge tube having an anode, a cathode and a grid, a resonant circuit connected between said anode and said grid, the resonant frequency of said circuit being in excess of 300 megacycles per second, energising circuits for said anode and cathode to sustain electrical oscillations in said resonant circuit, an antenna coupled to said resonant circuit and exposed to said remote point so as to transmit short wave lengths to said remote point and receive reflected waves therefrom, and thus be subject to variation with variation in distance between the said two points, and an indicating instrument connected in the grid circuit of said space discharge tube, said instrument being responsive to current flowing in said grid circuit but non-responsive to the cyclic variations of such current due to the periodic phase change of the received reflected wave with respect to the transmitted wave as the distance between the two points varies, whereby said instrument indicates continuously and steadily over the entire range of its response the degree of separation of the two points.

2. A device of the character described for indicating the distance between one point at which said device is located and a remote point, comprising a space discharge tube having an anode, a cathode and a grid, an inductance connected to said anode, an anode energising circuit connected to said inductance, an inductance connected to the said grid, a capacitance across said inductances to produce a resonant circuit having a frequency in excess of 300 megacycles per second, a resistance connected to the grid inductance, an indicating instrument in circuit with said resistance so that said resistance and the indicating instrument are serially connected in the grid circuit of the space discharge tube, an electrical shielding means for said resonant circuit and associated space discharge tube, an antenna coupled to said resonant circuit, said antenna being at least in part unshielded and exposed to said remote point so as to transmit short wave lengths to said remote point and receive reflected waves therefrom, and thus be subject to variation with variation in distance between the said two points, said indicating instrument being responsive to current flowing in the grid circuit of the space discharge tube but non-responsive to the cyclic variations of such current due to the periodic phase change of the received reflected wave with respect to the transmitted wave as the distance between the two points varies, whereby said instrument indicates continuously and steadily over the entire range of its response the degree of separation of the two points.

KENYON SECRETAN.
JAMES HORSFALL.